(12) United States Patent
Hegler

(10) Patent No.: US 7,517,210 B1
(45) Date of Patent: Apr. 14, 2009

(54) APPARATUS FOR THE MANUFACTURE OF COMPOUND PIPES

(76) Inventor: Ralph Peter Hegler, Schillerstrasse 7, 97688 Bad Kissingen (DE)

( * ) Notice: Subject to any disclaimer, the term of this patent is extended or adjusted under 35 U.S.C. 154(b) by 0 days.

(21) Appl. No.: 11/871,325

(22) Filed: Oct. 12, 2007

(30) Foreign Application Priority Data

Oct. 13, 2006 (DE) .................. 10 2006 048 512

(51) Int. Cl.
*B29C 47/90* (2006.01)
(52) U.S. Cl. .................. 425/233; 425/326.1; 425/336; 425/369; 425/396
(58) Field of Classification Search .................. 425/233, 425/326.1, 336, 369, 396
See application file for complete search history.

(56) References Cited

U.S. PATENT DOCUMENTS

| | | |
|---|---|---|
| 3,677,676 A | 7/1972 | Hegler |
| 4,145,387 A * | 3/1979 | Hegler et al. .................. 264/442 |

FOREIGN PATENT DOCUMENTS

| | | |
|---|---|---|
| CA | 2391815 A1 | 2/2001 |
| DE | 6908040 | 2/1969 |
| DE | 1704718 | 7/1971 |
| DE | 19947434 A1 | 3/2001 |
| DE | 10032308 | 1/2002 |
| GB | 1258181 | 12/1971 |

OTHER PUBLICATIONS

Foreign Search Report issued on priority German patent application No. 10-2006-048512.2 (2007) dated Jul. 20, 2007.

* cited by examiner

*Primary Examiner*—Robert B Davis
*Assistant Examiner*—Joseph Leyson
(74) *Attorney, Agent, or Firm*—James B. Conte

(57) ABSTRACT

An apparatus for the manufacture of compound pipes with an oval cross-section is equipped with mold halves which advance in a direction of production and of which two at a time combine as a pair on a molding path to form one mold. An injection head of at least one extruder is arranged upstream of the molding path. An external nozzle used for the creation of an external tube is substantially circular in shape and is located at a distance upstream of the molding path. An internal nozzle with a cross-section similar to the oval cross-section of the pipe to be created is located inside the molding path. When entering the molding path, the external tube extruded through the external nozzle is expanded in one direction and pressed together in a direction which is perpendicular to the former.

5 Claims, 7 Drawing Sheets

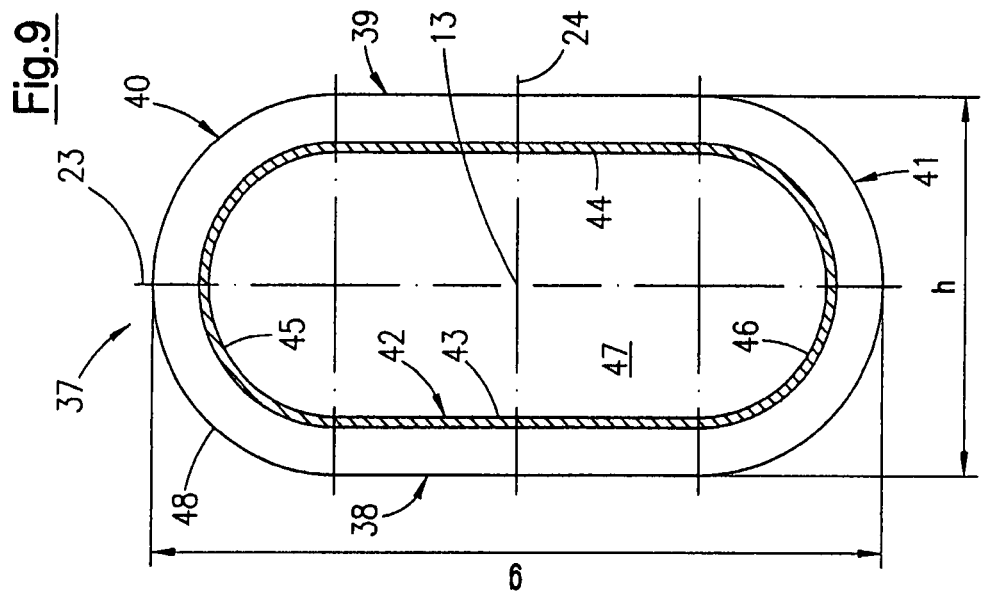
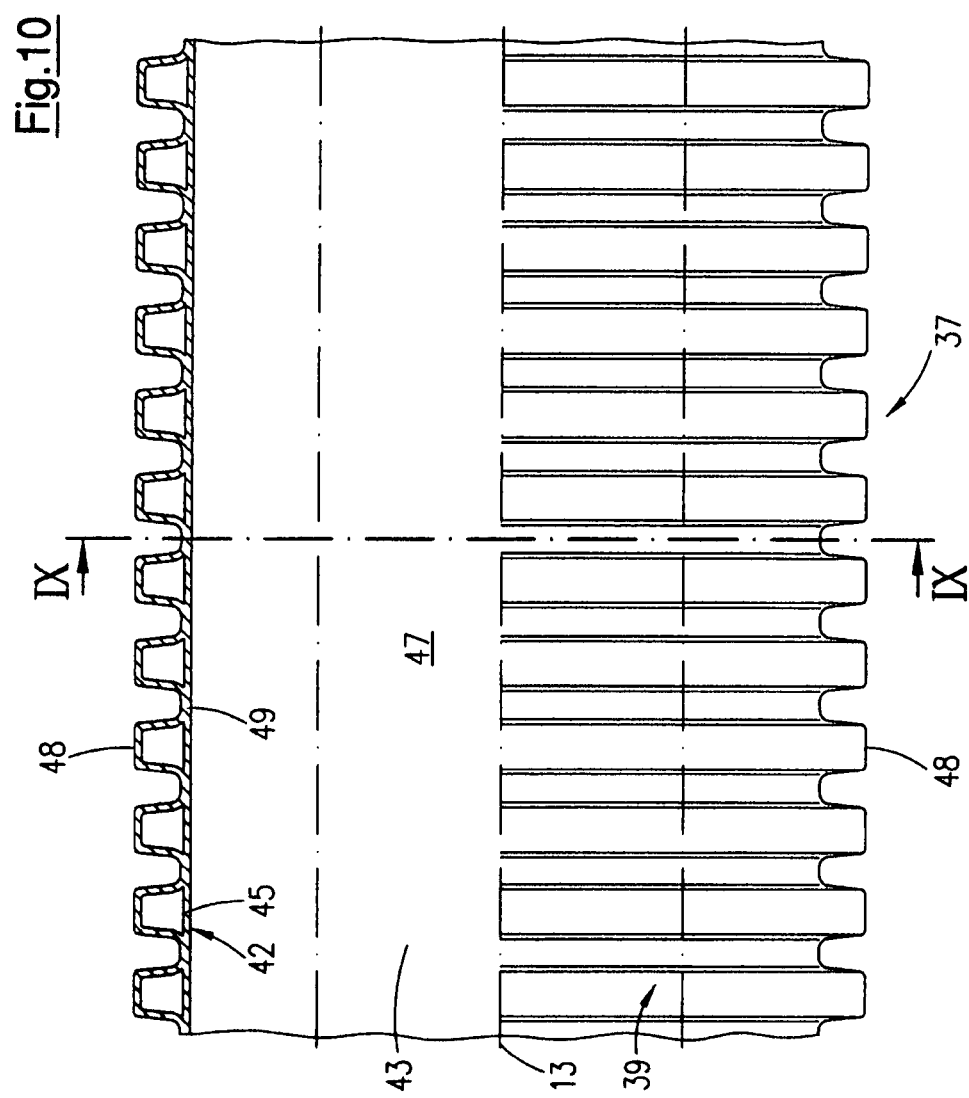

APPARATUS FOR THE MANUFACTURE OF COMPOUND PIPES

CROSS REFERENCE TO RELATED APPLICATIONS

This application claims priority to German patent application no. 10-2006-048512.2, filed Oct. 13, 2006, the content of which is hereby incorporated by reference by its entirety.

BACKGROUND OF THE INVENTION

1. Field of the Invention

The invention relates to an apparatus for the manufacture of compound pipes wherein mould halves, which are provided with annular mould recesses and of which two at a time are combined as a pair on a moulding path to form one mould, are arranged to be guided in a circuit and in a direction of production, wherein the mould recesses are connected to partial vacuum ducts formed in the mould halves, wherein an injection head of at least one extruder is arranged upstream of the moulding path, wherein the injection head is provided with an external nozzle for extrusion of an external tube, and, arranged downstream in direction of production, with an internal nozzle located inside the moulding path for extrusion of an internal tube, and with a cooling and calibrating mandrel arranged downstream at a rear end of the injection head in direction of production.

2. Background Art

Such an apparatus is known for example from U.S. Pat. No. 5,320,797. This known apparatus is used for the manufacture of compound pipes with a circular cross-section consisting of a smooth cylindrical internal tube and a corrugated external tube which are manufactured by co-extrusion. Such compound pipes with an oval cross-section thus cannot be easily manufactured from thermoplastic polymer. Such known oval compound pipes are for example used for the transport of air and similar media. They are particularly applicable for heating, ventilation and air conditioning systems or for electrical installations. Although the apparatus of the generic kind cannot be easily used for the manufacture of such oval compound pipes, the compound pipes manufactured on such apparatuses have the great advantage of possessing a high internal stiffness, in particular a high ring stiffness, and a low drag.

SUMMARY OF THE INVENTION

Thus it is the object of this invention to develop an apparatus of the generic kind which can be used for the manufacture of compound pipes with an oval cross-section.

This object is attained in accordance with the invention by the mould recesses having an oval cross-section with a vertical major axis of a length g and a horizontal minor axis of a length h, by the internal nozzle having an oval cross-section similar to the oval cross-section of the mould recesses, by the external nozzle having an approximately circular cross-section with a diameter f, with h<f<g, and by the external nozzle being arranged at a distance e upstream of the moulding path and beyond a region of collision with mould halves.

The embodiment of the external nozzle allows for extrusion of an external tube whose diameter is smaller than the length of the major axis but larger than the length of the minor axis of the oval compound pipe to be created.

The external nozzle is arranged at an appropriate distance upstream of the already closed moulding path so that the external tube, on its way into the moulding path advancing in the direction of production, is not only constricted laterally but also expanded at the upper and lower part. At the same time, this configuration prevents the external nozzle from colliding with approaching mould halves which are pivoted into the moulding path. The interior tube, on the other hand, is already extruded to form a shape similar to the final shape and size of the pipe to be created.

The advantageous further embodiment, wherein a width of the external nozzle constantly changes throughout its circumference, the ratio between a width b in an upper and a lower part of the external nozzle and a width c in a lateral part of the external nozzle being defined as c<b, ensures that according to the described forming process, the external tube receives an approximately identical wall thickness throughout its circumference on the way from the external nozzle to the moulding path, which then also applies to the external wall of the pipe to be created.

Further advantages, features and details of the invention will become apparent upon consideration of the ensuing description of an exemplary embodiment when taken in conjunction with the accompanying drawing.

BRIEF DESCRIPTION OF THE DRAWINGS

FIG. 9 shows the cross-sectional view of a compound pipe manufactured on the apparatus according to the invention, with the cross section being taken according to section line IX-IX in FIG. 10; and FIG. 10 shows a partially open longitudinal view of the compound pipe according to FIG. 9.

DESCRIPTION OF THE PREFERRED EMBODIMENT

Figure 1:
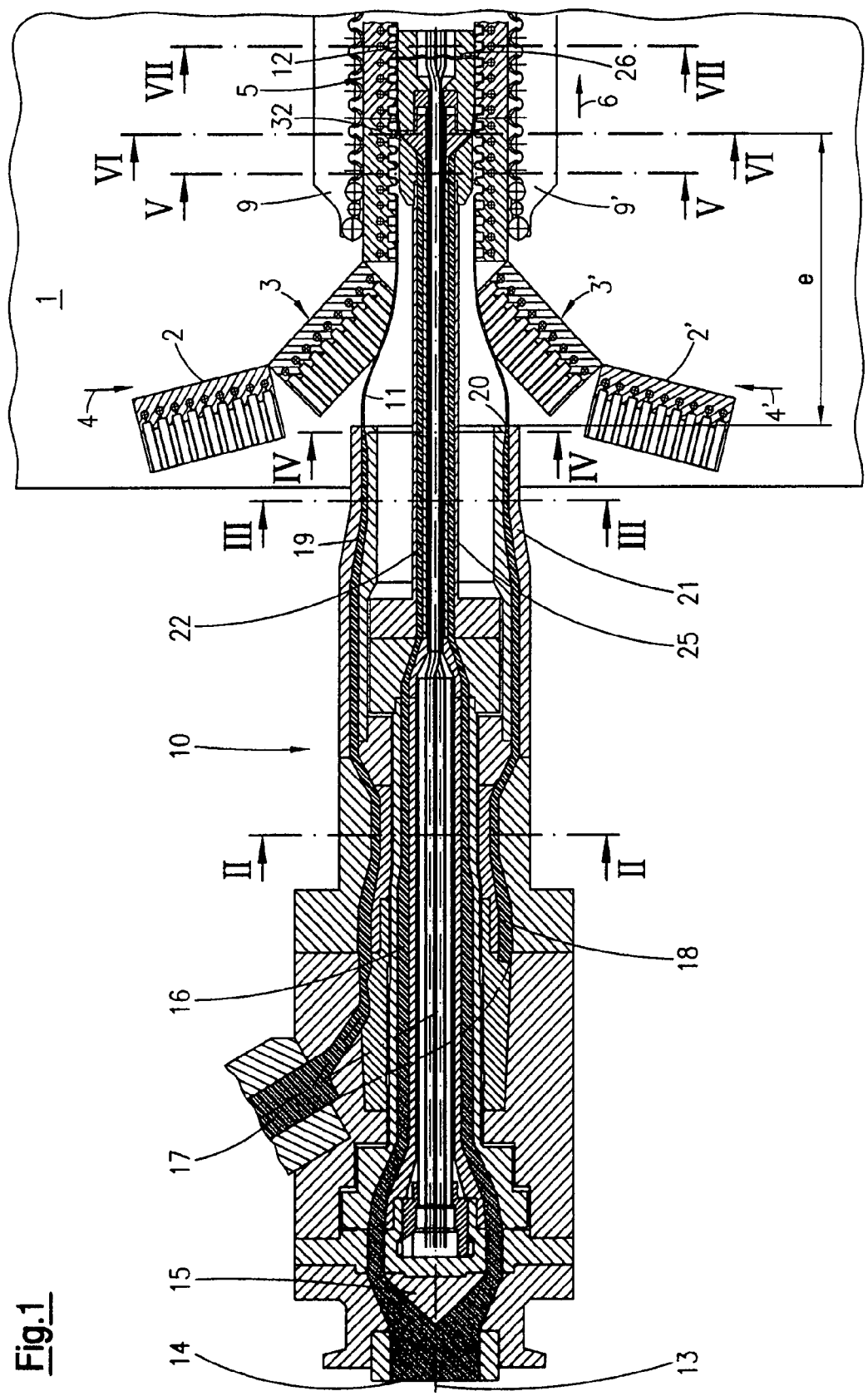
FIG. 1 shows a horizontal longitudinal section through one part of an apparatus according to the invention, more precisely through an injection head and the adjoining part of a moulding path.
Figure 5:
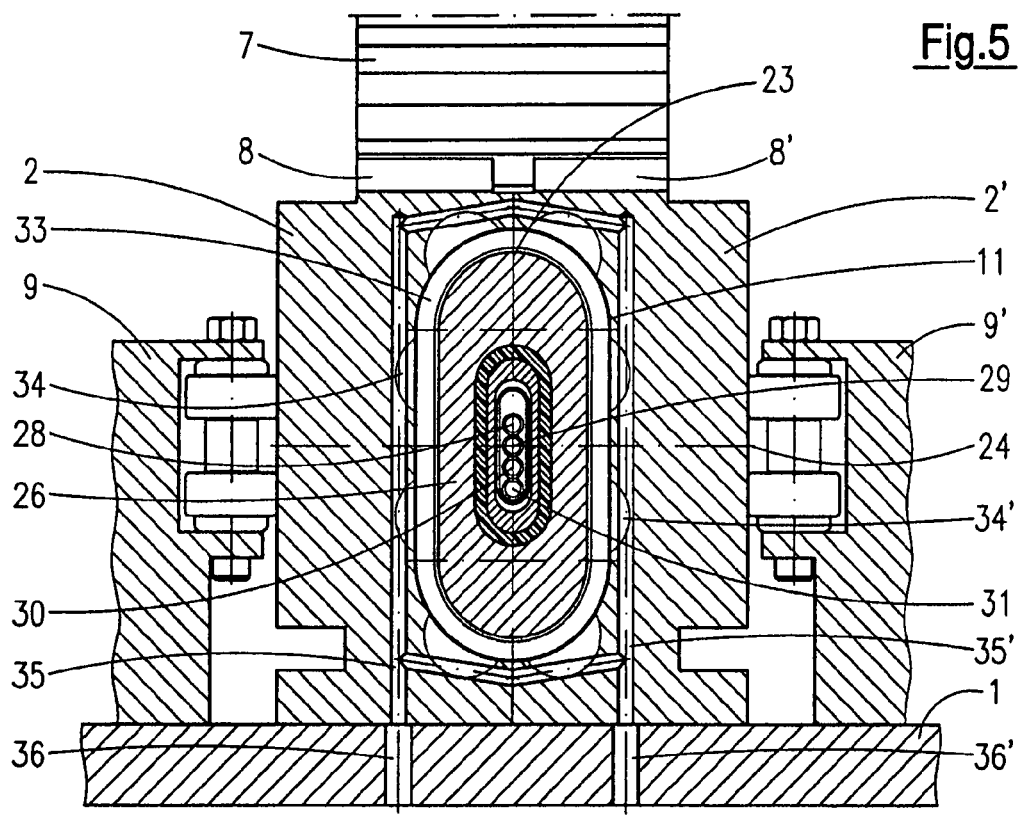
FIG. 5 shows a cross-section through the moulding path taken upstream of the internal nozzle according to section line V-V in FIG. 1.
Figure 6:
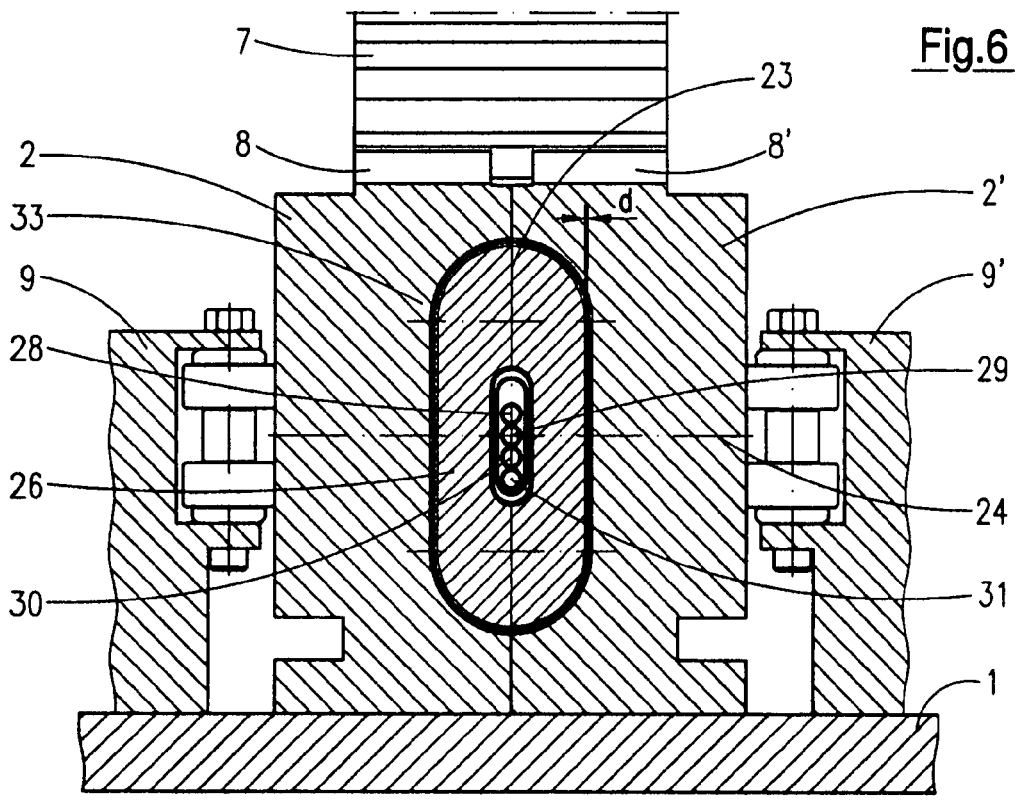
FIG. 6 shows a cross-section through the moulding path in the area of the internal nozzle according to section line VI-VI in FIG. 1.
Figure 7:
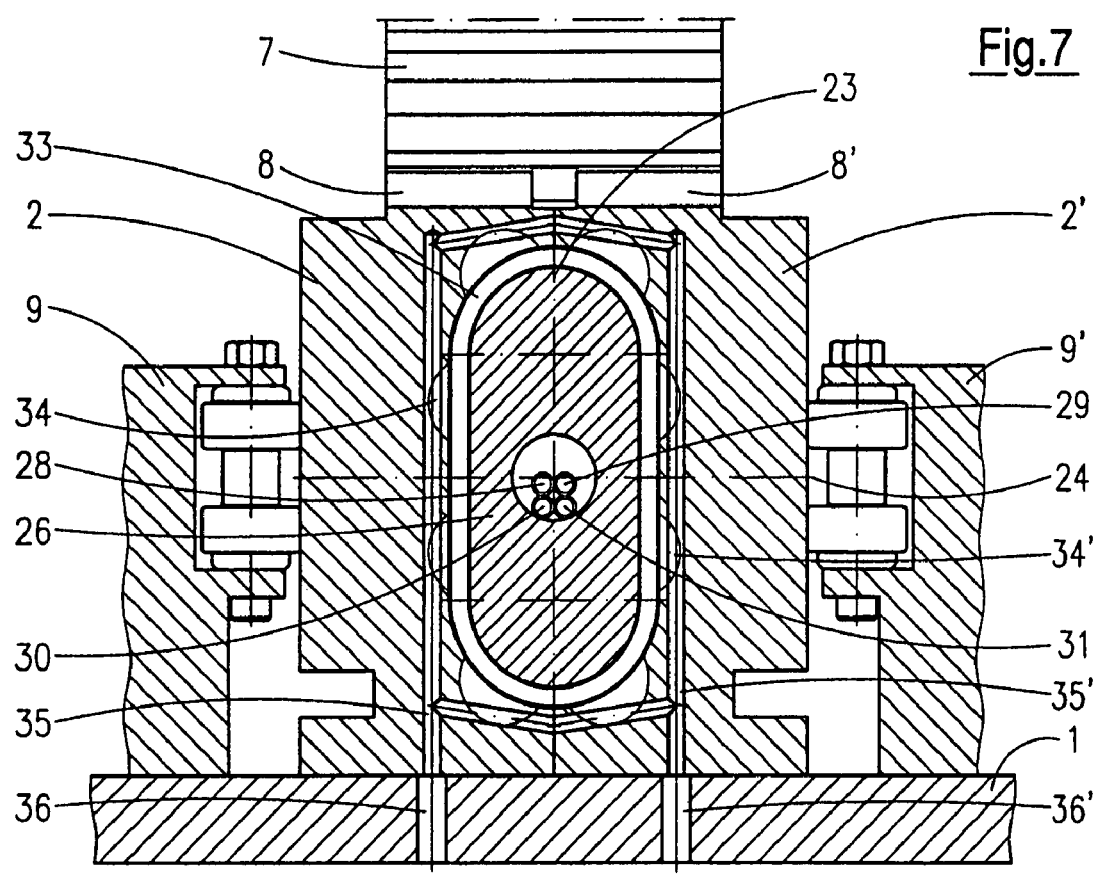
FIG. 7 shows a cross-section through the moulding path taken down-stream of the internal nozzle according to section line VII-VII in FIG. 1.
Figure 8:
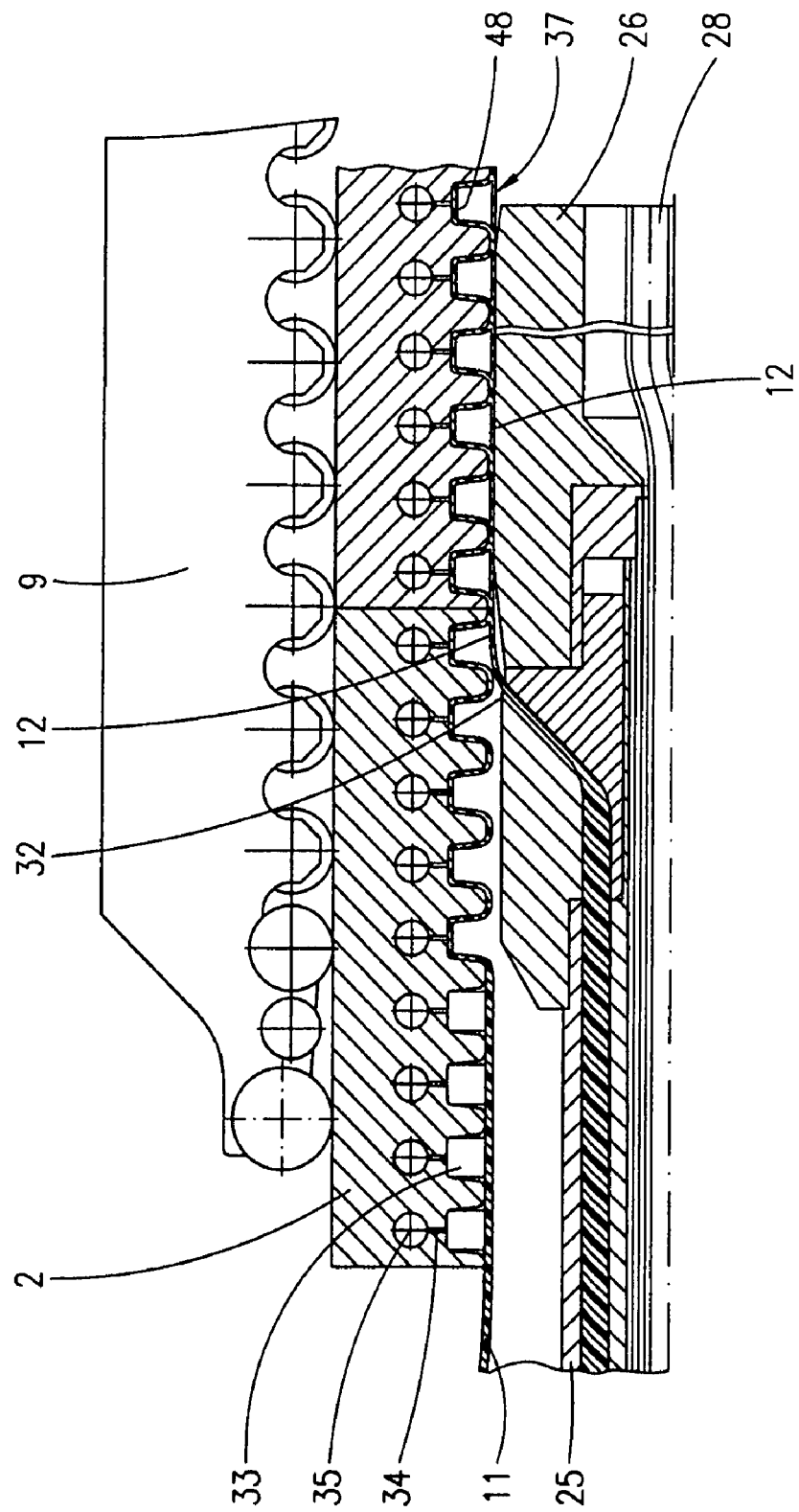
FIG. 8 shows a greatly enlarged partial view of FIG. 1 in the area of the internal nozzle.

The apparatus for the manufacture of compound pipes made of thermoplastic polymer, which is only partially depicted in FIG. 1, has a basic structure which is known for example from U.S. Pat. No. 5,346,384 and U.S. Pat. No. 5,320,797. It is provided with a machine table 1 with mould halves 2, 2' arranged on top which are pivotally connected to each other to form two so-called chains 3, 3'. The endless, i.e. closed, chains 3, 3' thus formed are guided along reversing wheels and feed rollers not shown here. When rotating in the direction indicated by the rotational arrows 4, 4', they are pivoted into a moulding path 5 where two mould halves 2, 2' at a time are combined to form a pair of moulds. In a direction of production 6, pairs of moulds are arranged successively in a closely-packed manner. The pairs of moulds are driven on the moulding path 5 with respect to the direction of production 6 by means of a drive pinion 7 which engages from above with tooth systems 8, 8' provided on the upper side of the mould halves 2, 2'. The mould halves 2, 2' are pressed tightly against each other along the moulding path 5 by means of lateral guide rails 9, 9', as can be seen in FIGS. 5 to 7.

An injection head 10, also referred to as a pipe head, is disposed upstream of moulding path 5 and serves to extrude two thermoplastic tubes, namely an external tube 11 and an internal tube 12, which are located inside each other, meaning they are co-extruded. Concentrically with a central longitudinal axis 13 of injection head 10, injection head 10 has a first supply channel 14 projecting into it which is connected to a first extruder. This supply channel 14 is widened at a guide cone 15 and is then directed into a circular-shaped first internal channel section 16 which is also disposed concentrically with axis 13.

Figure 2:
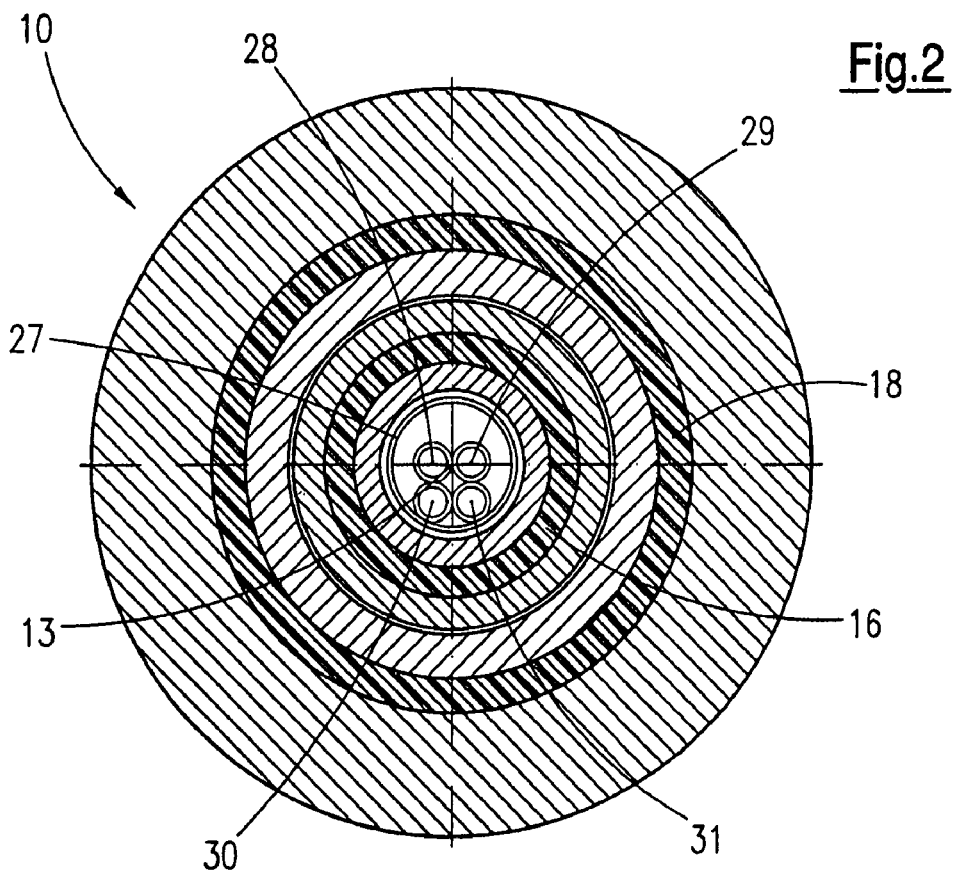
FIG. 2 shows a cross-section through the injection head according to section line II-II in FIG. 1.

In the central part of the first internal channel section 16—with reference to the longitudinal direction of axis 13—a second supply channel 17 which is connected to a second extruder projects laterally into injection head 10. This second supply channel 17 projects into an also circular-shaped first external channel section 18 which is disposed concentrically with axis 13 around the first internal channel section 16, as shown in FIG. 2.

An external nozzle channel 19, which ends in an external nozzle 20, adjoins the first external channel section 18. The external nozzle channel 19 is formed in an external nozzle tube 21 which ends with external nozzle 20 arranged at a considerable distance upstream of moulding path 5, as can be seen in FIG. 1.

Figure 3:
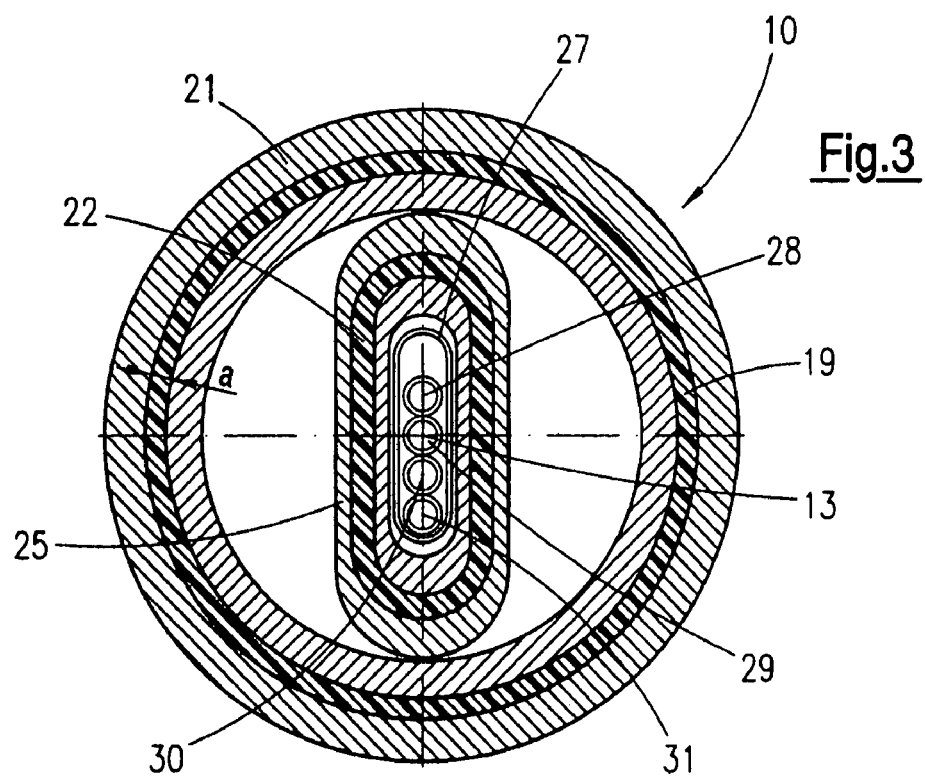
FIG. 3 shows a cross-section taken downstream with regard to FIG. 2 through the injection head according to section line III-III in FIG. 1.
Figure 4:
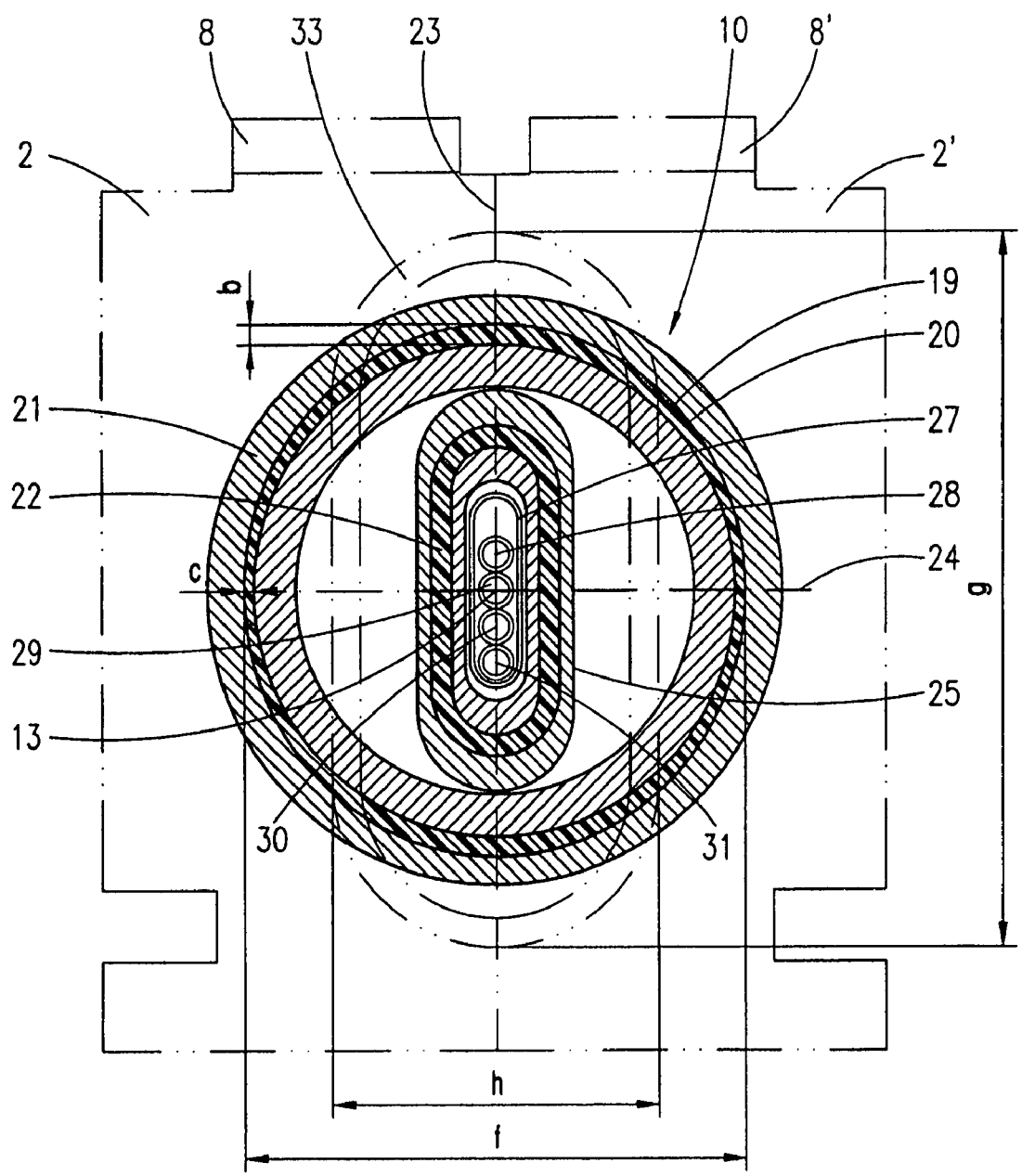
FIG. 4 shows a cross-section through the injection head in the area of the external nozzle according to section line IV-IV in FIG. 1.

In the area of transition from the substantially solid injection head 10 to the external nozzle tube 21, the first internal channel section 16 extends into a second internal channel section 22 which has an oval cross-section. In this respect, each cross-sectional shape which is not circular in shape, has a major axis 23 as well as a minor axis 24 arranged perpendicularly to major axis 23, is symmetrical with major axis 23 and minor axis 24 and has no concave wall sections is to be understood as an oval cross-section. Major axis 23 is hereby arranged vertically, as can be seen in FIGS. 3 to 7. The second internal channel section 22 is formed in an also oval shaped internal nozzle tube 25. As can be seen in FIGS. 3 and 4, the internal nozzle tube 25 supports the external nozzle tube 21 in the area of major axis 23, i.e. in vertical direction. A cooling and calibrating mandrel 26 is attached to the internal nozzle tube 25 inside moulding path 5. A protection tube 27 disposed inside internal nozzle tube 25 carries supply hoses 28, 29 for cooling water and 30, 31 for air which are acted upon by different pressures and are directed to the cooling and calibration mandrel 26. This protection tube 27 inside internal nozzle tube 25 has an oval cross-section as well, as shown in FIGS. 3 to 6.

Unlike in the area of the first external channel section 18 (refer to FIG. 2), external nozzle channel 19 does not have the same width a in the area of external nozzle 20, as can be seen in FIG. 4. It does have a circular cross-section; as clearly shown in FIG. 4, width b in the upper and lower part, i.e. in the upper and lower part of major axis 23, exceeds width c in the lateral part, i.e. in the area of minor axis 24. As it exits external nozzle 20, the wall thickness of external tube 11 is thus identical to the widths b and c, i.e. not constant throughout its circumference but substantially greater in the upper and lower part as compared to the lateral parts, with the transition being of a continuous nature. In contrast, the second internal channel section 22 and the internal nozzle 32 formed at the end of internal nozzle tube 25 have a constant width d along their entire circumference, thus ensuring a substantially constant wall thickness d of the internal tube 12 exiting internal nozzle 32.

Consequently, an external tube 11 which is of circular shape but has distinctly different wall thicknesses b and c is formed by extrusion through external nozzle 20. This external tube 11 is extruded at a considerable distance e from moulding path 5 to prevent collision with the mould halves 2, 2' approaching from the sides.

The mould halves 2, 2' have oval annular mould recesses 33 with partial vacuum slots 34, 34' projecting into them which are formed at the partial vacuum ducts 35, 35' inside the mould halves 2, 2'. These mould recesses 33 have an oval shape corresponding to the external shape of a pipe to be created. Along the moulding path, the partial vacuum ducts 35, 35' overlap with partial vacuum connections 36, 36' which are formed at machine table 1 and, as known in detail from U.S. Pat. No. 4,492,551. Due to the partial vacuum applied to the mould recesses, i.e. underpressure with regard to atmospheric pressure, the external tube 11 is sucked into the mould recesses 33 upon entering moulding path 5, and thus adheres to the internal wall of the mould halves. As can be seen in FIG. 4, when exiting external nozzle 20, external tube 11 has an external diameter f which is distinctly smaller than the largest diameter g of the mould recesses 33 in the direction of major axis 23, and which is distinctly larger than the smallest diameter h of the mould recesses 33 in the direction of minor axis 24. Due to these illustrated geometrical conditions, external nozzle 20 is also located at a relatively large distance e upstream of the closed moulding path 5. When entering moulding path 5 which advances in the direction of production 6, external tube 11 is thus pressed together laterally in the direction of minor axis 24 toward the central longitudinal axis, thus causing the wall thickness to increase, and expanded vertically in the direction of major axis 23 with the wall thickness being reduced, as shown by FIGS. 4 to 7 taken in conjunction with FIG. 1. As can be seen in FIG. 1, this process of constriction takes place in a continuous manner, namely on the way from external nozzle 20 to the closed moulding path 5. The same applies for the expansion of external tube 11 in vertical direction, i.e. in the direction of major axis 23, although it must be pointed out that the expansion of external tube 11 in vertical direction does not start until the partial vacuum ducts 35, 35' provided inside the mould halves 2, 2' have overlapped with the partial vacuum connections 36, 36'. The expansion thus starts a little later than the constriction of external tube 11.

Internal nozzle 32 is located at the initial zone of moulding path 5 but already in the closed portion of moulding path 5 where external tube 11 has already received its oval corrugated shape according to the design of the mould recesses 33. As can be seen in FIG. 6, when exiting internal nozzle 32, internal tube 12 has already received a cross-section which remains the same when it is adhered to and welded with the inside of the external tube. The cooling and calibrating mandrel 26, which is of oval shape as well, supports internal tube 12. This method is generally known, and illustrated and described for example in U.S. Pat. No. 5,346,384.

The compound pipe 37 manufactured in the described manner has an oval cross-section. In the present case, this oval cross-section is defined or formed by two wall sections 38, 39 which are parallel to each other, and two half-cylindrical wall sections used to connect the former in order to form a closed cross-section. Pipe 37 has a major axis 23 with a length g and a minor axis 24 with a length h, with—as already mentioned—each of the lengths g and h being related to the external diameter of pipe 37. The ratio of length g of major axis 23 and length h of minor axis 24 is defined as: $1.5 \leqq g/h \leqq 5.0$. These dimensional ratios also help to determine the substantial extent of both constriction and expansion required for external tube 11 after exiting external nozzle 20.

Furthermore, pipe 37 similarly has an internal cross-section which is defined by an overall smooth internal wall 42. This internal wall 42 is also formed by two plane internal wall sections 43, 44 which are parallel to each other, and two half-cylindrical internal wall sections 45, 46 used to connect the internal wall sections 43, 44. The overall smooth internal wall 42 defines a flow channel 47 for the transport of gas, and in particular of air, in air conditioning or ventilation systems.

Corresponding to the described shape of the mould recesses 33, the external wall of pipe 37 is composed of corrugations 48, as can be seen in FIGS. 9 and 10. These have an approximately trapezoidal cross-section. Corrugation troughs are defined by bottom sections 49 connecting adjacent corrugations 48. External tube 11 and internal tube 12 are welded together in the area of the bottom sections 49.

What is claimed is:

1. An apparatus for the manufacture of compound pipes,
   wherein mould halves (2, 2'), which are provided with annular mould recesses (33) and of which two at a time are combined as a pair on a moulding path (5) to form one mould, are arranged to be guided in a circuit and in a direction of production (6),
   wherein the mould recesses (33) are connected to partial vacuum ducts (35, 35') formed in the mould halves (2, 2'),
   wherein an injection head (10) of at least one extruder is arranged upstream of the moulding path (5),
   wherein the injection head (10) is provided with an external nozzle (20) for extrusion of an external tube (11), and, arranged down-stream in direction of production (6), with an internal nozzle (32) located inside the moulding path (5) for extrusion of an internal tube (12), and with a cooling and calibrating mandrel (26) arranged downstream at a rear end of the injection head (10) in direction of production (6),
   wherein the mould recesses (33) have an oval cross-section with a vertical major axis (23) of a length g and a horizontal minor axis (24) of a length h,
   wherein the internal nozzle (32) has an oval cross-section similar to the oval cross-section of the mould recesses (33),
   wherein the external nozzle (20) has an approximately circular cross-section with a diameter f, with $h<f<g$, and
   wherein the external nozzle (20) is arranged at a distance e upstream of the moulding path (5) and beyond a region of collision with mould halves (2, 2').

2. An apparatus of claim 1, wherein a width of the external nozzle (20) constantly changes throughout its circumference, the ratio between a width b in an upper and a lower part of the external nozzle (20) and a width c in a lateral part of the external nozzle (20) being defined as: $c<b$.

3. An apparatus of claim 1, wherein the mould halves (2, 2') are arranged on a machine table (1).

4. An apparatus of claim 3, wherein partial vacuum connections (36, 36') are arranged inside the machine table (1) along the moulding path (5) which can be made to overlap with the partial vacuum ducts (35, 35').

5. An apparatus of claim 1, wherein the distance e between external nozzle (20) and moulding path (5) is defined as: $e \geqq 300$ mm.

* * * * *